United States Patent
Hsu et al.

(10) Patent No.: US 9,124,137 B2
(45) Date of Patent: Sep. 1, 2015

(54) ENERGY MANAGEMENT METHOD AND SYSTEM, AND COMPUTER READABLE STORAGE MEDIUM FOR STORING THE METHOD

(75) Inventors: Shao-Hsuan Hsu, New Taipei (TW); Pei-Lin Hou, New Taipei (TW); Yu-Qiao Hong, Zhongli (TW); Miao-Fen Chueh, Taipei (TW); Yu-Lun Hsu, Tainan (TW)

(73) Assignee: INSTITUTE FOR INFORMATION INDUSTRY, Taipei (TW), `

( * ) Notice: Subject to any disclaimer, the term of this patent is extended or adjusted under 35 U.S.C. 154(b) by 958 days.

(21) Appl. No.: 13/298,923

(22) Filed: Nov. 17, 2011

(65) Prior Publication Data

US 2013/0099564 A1  Apr. 25, 2013

(30) Foreign Application Priority Data

Oct. 19, 2011 (TW) .............................. 100137950 U

(51) Int. Cl.
- *H02J 1/00* (2006.01)
- *H02J 3/00* (2006.01)
- *H02J 3/38* (2006.01)

(52) U.S. Cl.
CPC ........... *H02J 3/382* (2013.01); *H02J 2003/003* (2013.01); *Y04S 10/54* (2013.01); *Y10T 307/344* (2015.04)

(58) Field of Classification Search
CPC ................................ H02J 3/382; Y04S 10/54
USPC .............. 307/23, 43, 64–66, 80, 84; 700/286, 700/291, 295, 297
See application file for complete search history.

(56) References Cited

U.S. PATENT DOCUMENTS

2010/0198421 A1* 8/2010 Fahimi et al. .................. 700/291
2010/0207448 A1* 8/2010 Cooper et al. .................. 307/20

(Continued)

FOREIGN PATENT DOCUMENTS

DE  202010015254 U1  3/2011
EP       2469678 A1   6/2012

(Continued)

OTHER PUBLICATIONS

Nakashima EP 2469678 A1.*
English translation of abstract of DE 202010015254 U1.
English translation of abstract of WO 2011/040471 A1.

*Primary Examiner* — Rexford Barnie
*Assistant Examiner* — Rasem Mourad
(74) *Attorney, Agent, or Firm* — McClure, Qualey & Rodack, LLP

(57) ABSTRACT

An energy management method is provided. The energy management method comprises the steps of retrieving load information from at least one load and retrieving energy-supplying information from an energy supply system having a grid power source, a renewable energy generation module and an energy storage module to instantly calculate first and second energy thresholds. When an energy production of the renewable energy generation module is smaller than the second energy threshold, the grid power source or the energy storage module is controlled to supply energy to the load. When the energy production is between the first and the second energy thresholds, the renewable energy generation module is controlled to supply energy to the load. When the energy production is larger than the first energy threshold, the renewable energy generation module is controlled to supply energy to the load and charge the energy storage module.

19 Claims, 5 Drawing Sheets

(56) References Cited

U.S. PATENT DOCUMENTS

2011/0254372 A1* 10/2011 Haines et al. .................. 307/66
2011/0304295 A1* 12/2011 McNally ...................... 320/101
2011/0307113 A1* 12/2011 Kumar et al. ................ 700/291

FOREIGN PATENT DOCUMENTS

| WO | 2008/125696 A2 | 10/2008 |
| WO | 2011/040471 A1 | 4/2011 |

* cited by examiner

ENERGY MANAGEMENT METHOD AND SYSTEM, AND COMPUTER READABLE STORAGE MEDIUM FOR STORING THE METHOD

RELATED APPLICATIONS

This application claims priority to Taiwan Application Serial Number 100137950, filed Oct. 19, 2011, which is herein incorporated by reference.

BACKGROUND

1. Technical Field

The present invention relates to energy management technology. More particularly, the present invention relates to an energy management method and system, and to a computer readable storage medium for storing the method.

2. Description of Related Art

Renewable energy is energy which comes from natural resources such as sunlight, wind, and tides. The quantity of fossil fuels is limited. However, the rate of consumption of fossil fuels is increasing day by day. Hence, many people have become interested in renewable energy. Some technologies used in power systems integrate renewable sources of energy into the grid to supply power. A power-saving mechanism can thus be accomplished.

However, a problem with renewable energy is that it is unstable. For example, the energy production of a photovoltaic system primarily depends on the weather conditions of the geographical location where the system is installed. If renewable energy is used to supply power for a long time, the instability of the renewable energy will make the power system unreliable. On the other hand, if a grid power source is used for a long time, a power-saving mechanism cannot be accomplished. Thus, in order to steadily and efficiently supply power, appropriate timing control to switch between a renewable energy module and a grid power source is important.

Accordingly, what is needed is an energy management method and system, and a computer readable storage medium for storing the method to overcome the above issues. The present disclosure addresses such a need.

SUMMARY

An aspect of the present disclosure is to provide an energy management system connected between a power supply system and at least one load, wherein the power supply system comprises a grid power source, a renewable energy generation module and an energy storage module. The energy management system comprises a power monitoring module, a switch module, a load management module and an intelligent control module. The power monitoring module is connected to the power supply system to retrieve energy-supplying information of the power supply system, wherein the energy-supplying information comprises an energy production of the renewable energy generation module. The switch module controls a connection relation between the load and the power supply system. The load management module retrieves load information of the load. The intelligent control module receives the energy-supplying information and the load information to instantly calculate a first energy threshold and a second energy threshold smaller than the first energy threshold. When the energy production of the renewable energy generation module is smaller than or equal to the second energy threshold, the intelligent control module controls the switch module so that the grid power source or the energy storage module supplies energy to the load. When the energy production is between the first and the second energy thresholds, the intelligent control module controls the switch module so that the renewable energy generation module supplies energy to the load. When the energy production is larger than the first energy threshold, the intelligent control module controls the switch module so that the renewable energy generation module supplies energy to the load and charges the energy storage module.

Another aspect of the present disclosure is to provide an energy management method used in an energy management system, wherein the energy management system is connected between a power supply system and at least one load, wherein the power supply system comprises a grid power source, a renewable energy generation module and an energy storage module, the energy management method comprises the steps as outlined below. Energy-supplying information is retrieved from the energy supply system, wherein the energy-supplying information comprises an energy production of the renewable energy generation module. Load information from the load is retrieved. A first energy threshold and a second energy threshold smaller than the first energy threshold are instantly calculated according to the energy-supplying information and the load information. A relation of the energy production and the first and the second energy thresholds is determined. When the energy production of the renewable energy generation module is smaller than or equal to the second energy threshold, the grid power source or the energy storage module is controlled to supply energy to the load. When the energy production is between the first and the second energy thresholds, the renewable energy generation module is controlled to supply energy to the load. When the energy production is larger than or equal to the first energy threshold, the renewable energy generation module is controlled to supply energy to the load and charge the energy storage module.

Yet another aspect of the present disclosure is to provide a computer readable storage medium to store a computer program to execute an energy management method used in an energy management system, wherein the energy management system is connected between a power supply system and at least one load, wherein the power supply system comprises a grid power source, a renewable energy generation module and an energy storage module, the energy management method comprises the steps as outlined below. Energy-supplying information is retrieved from the energy supply system, wherein the energy-supplying information comprises an energy production of the renewable energy generation module. Load information from the load is retrieved. A first energy threshold and a second energy threshold smaller than the first energy threshold are instantly calculated according to the energy-supplying information and the load information. A relation of the energy production and the first and the second energy thresholds is determined. When the energy production of the renewable energy generation module is smaller than or equal to the second energy threshold, the grid power source or the energy storage module is controlled to supply energy to the load. When the energy production is between the first and the second energy thresholds, the renewable energy generation module is controlled to supply energy to the load. When the energy production is larger than or equal to the first energy threshold, the renewable energy generation module is controlled to supply energy to the load and charge the energy storage module.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
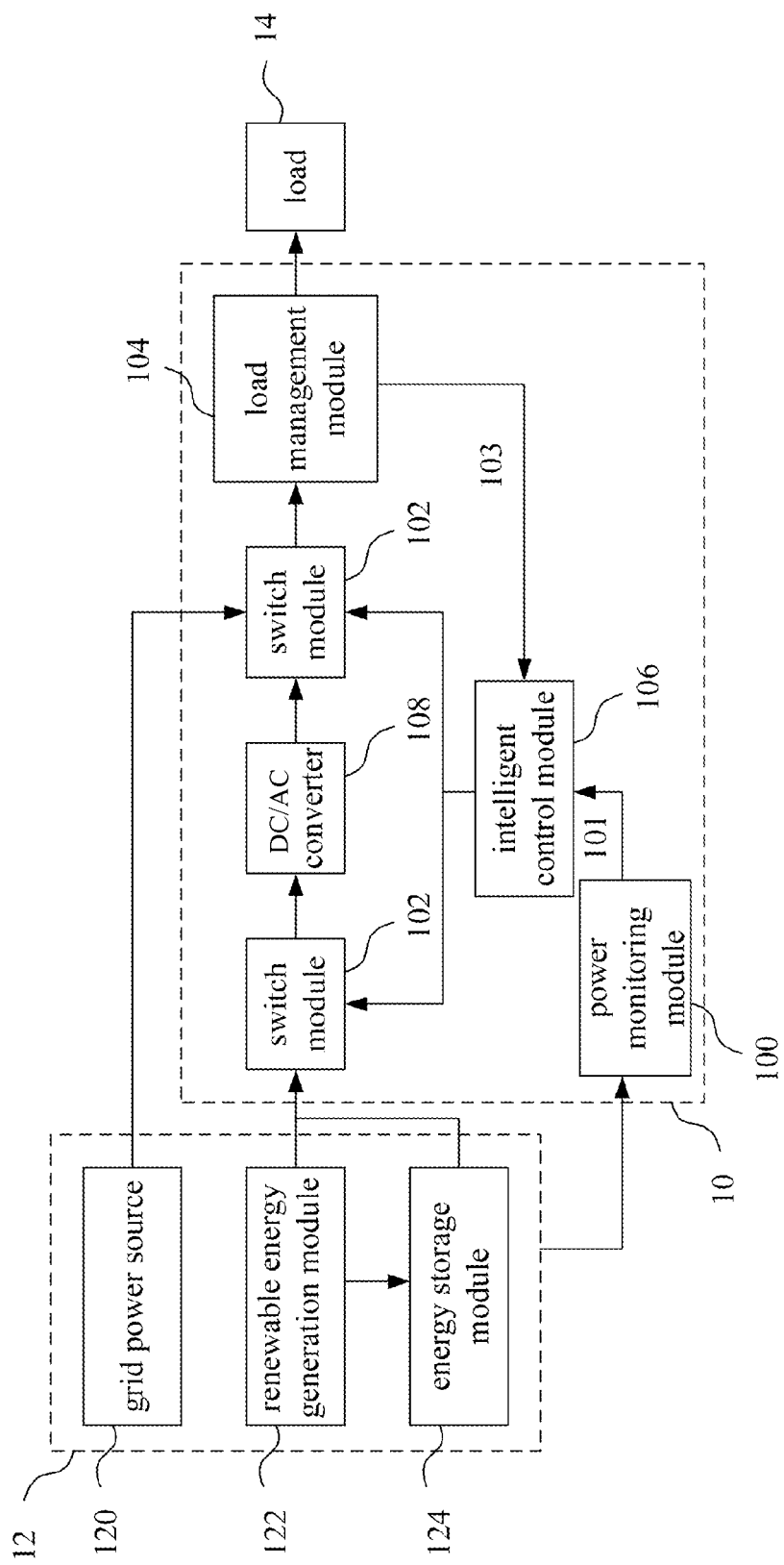
FIG. 1 is a block diagram of an energy management system of an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of an energy management system 10 of an embodiment of the present disclosure. The energy management system 10 is connected between a power supply system 12 and at least one load 14. The power supply system 12 comprises a grid power source 120, a renewable energy generation module 122 and an energy storage module 124. In different embodiments, the renewable energy generation module 122 can be a photovoltaic module, a wind power module, a hydroelectric power module or a module that generates another kind of renewable energy.

The energy management system 10 comprises a power monitoring module 100, switch modules 102, a load management module 104 and an intelligent control module 106.

The power monitoring module 100 is connected to the power supply system 12 to retrieve energy-supplying information 101 of the power supply system 12. The energy-supplying information 101 may comprise a power-supplying stability of the grid power source 120, an energy production of the renewable energy generation module 122, the amount of stored energy in the energy storage module 124 and other parameters. It is noted that the energy-supplying information 101 is instant information that varies with time. The load management module 104 retrieves load information 103 of the load 14, which is also instant information that varies with time. The switch modules 102 control a connection relation between the load 14 and the power supply system 12 so that one of the grid power source 120, the renewable energy generation module 122 and the energy storage module 124 supplies power to the load 14 using appropriate timing. When the renewable energy generation module 122 or the energy storage module 124 is used to supply power to the load 14, an DC/AC (direct current alternating current) converter 108 can be used such that the renewable energy generation module 122 or the energy storage module 124 supplies energy to the load 14 through the DC/AC converter 108. In the present embodiment, the number of the switch modules 102 is two. One of the switch modules 102 is used to select the renewable energy generation module 122 or the energy storage module 124. When the selection is made, the other switch module 102 is used to select between the grid power source 120 and the selected one of the renewable energy generation module 122 and the energy storage module 124.

The intelligent control module 106 receives the energy-supplying information 101 and the load information 103 to instantly calculate a first energy threshold and a second energy threshold, in which the second energy threshold is smaller than the first energy threshold.

Figure 2:
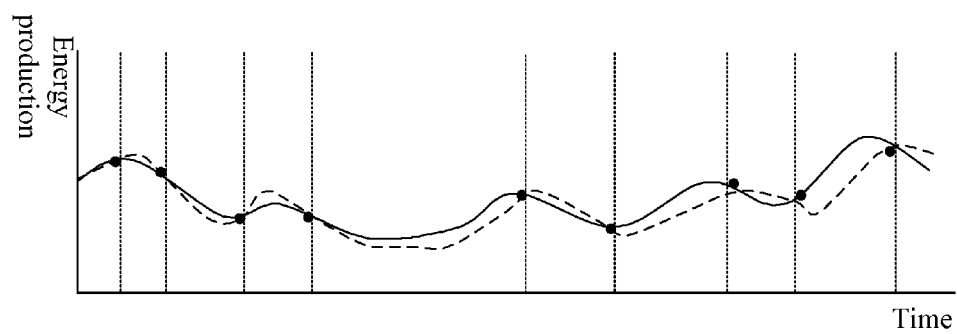
FIG. 2 is a graph showing changes in energy production of a renewable energy generation module depicted in FIG. 1.

FIG. 2 is a graph showing changes in energy production of the renewable energy generation module 122 depicted in FIG. 1. In FIG. 2, the x-axis represents time and the y-axis represents the amount of the energy production. The solid line is the curve of the energy production $P_i$ and the dashed line is the curve of a moving average of the energy production, in which the moving average is expressed as $(1/T)*\Sigma_{i=T2}^{T1} Pi$.

In order to determine the trend of the energy production, the intersection points of the curve of the energy production and the curve of the moving average are obtained. These intersection points separate the curve of the energy production into a plurality of sections. Each of the sections exhibits a uniform trend. The intersection points can be determined by the equation shown below:

$$(1/T)*\Sigma_{i=T}^{T1} Pi = Pi$$

Figure 3:
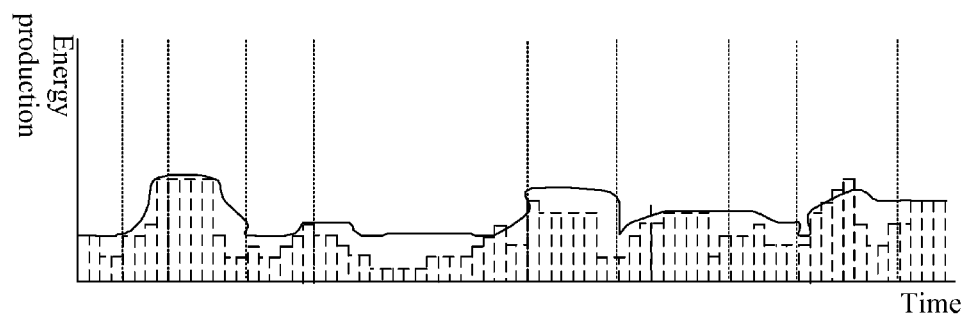
FIG. 3 is a graph showing the moving average of variations in energy production.

FIG. 3 is a graph showing the moving average $\delta$ of variations in energy production. The moving average $\delta$ of the variations in the energy production can be calculated after the variations $P_i - P_{i-1}$ of the energy production are obtained from the curve of the energy production depicted in FIG. 2, in which the moving average $\delta$ of the variations in the energy production is calculated by the following equation:

$$\delta = (1/L)\Sigma_{i=0}^{L}(|P_i - P_{i-1}|/P_i).$$

In the above equation, L represents the length of the section. As depicted in FIG. 3, the moving average $\delta$ of the variations in the energy production shows whether there are any abrupt variations in the energy production. When the moving average $\delta$ of the variations in the energy production is a small value, the energy production is stable. However, when the moving average $\delta$ of the variations in the energy production is a large value, the energy production is unstable. Hence, the moving average $\delta$ of the variations in the energy production can be used as the basis of a safe loading capacity between the energy production and the amount of the loading.

In an embodiment, the load amount of the load 14 in a unit time is $L_\alpha$, and the load amount of the energy storage module 124 when it is charged is $L_\beta$ and the safe loading capacity ratio is $\lambda = (1+\delta)$. The first energy threshold TH0 can be calculated according to the moving average $\delta$ of the variations in the energy production and a total load amount $(L_\alpha + L_\beta)$ of the load 14 and the energy storage module 124:

$$TH0 = (L_\alpha + L_\beta)*\lambda$$

The second energy threshold TH1 can be calculated using the moving average $\delta$ of the variations in the energy production and the load amount $L_\alpha$ of the load as follows:

$$TH1 = (L_\alpha)*\lambda$$

Figure 4:
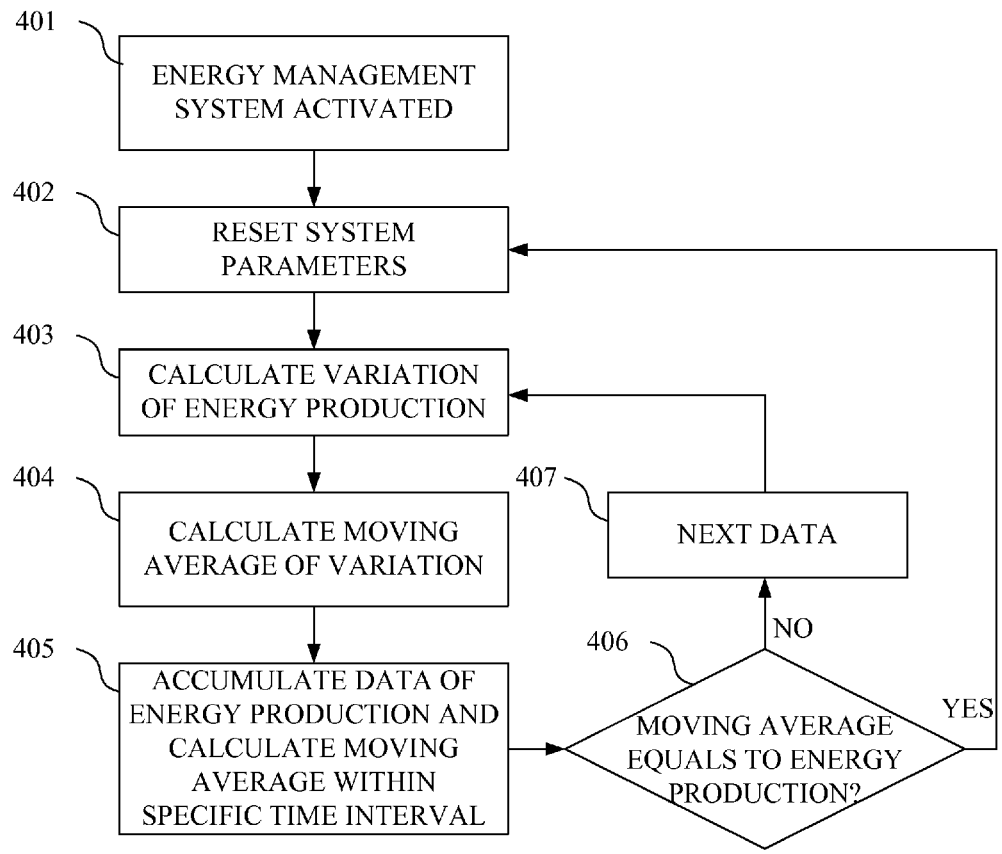
FIG. 4 is a flow chart of a process for establishing the graphs depicted in FIG. 2 and FIG. 3 in an embodiment of the present disclosure.

FIG. 4 is a flow chart of a process for establishing the graphs depicted in FIG. 2 and FIG. 3 in an embodiment of the present disclosure. In step 401, the energy management system 10 is activated, and in step 402, the system parameters are reset. In step 403, the intelligent control module 106 calculates the variations $P_i - P_{i-1}$ in the energy production and further calculates the moving average δ of the variations in the energy production in step 404.

In step 405, the intelligent control module 106 accumulates the data of the energy production $P_i$ (corresponding to the solid line depicted in FIG. 2) in different times and calculates the moving average of the energy production $P_i$ within a specific time interval T (corresponding to the dashed line depicted in FIG. 2). Subsequently, in step 406, the intelligent control module 106 determines whether the moving average of the energy production equals the energy production $P_i$. If they are equal, an intersection point of the two lines depicted in FIG. 2 is obtained. Hence, the process returns back to step 402 to reset the system parameters. When moving average of the energy production and the energy production $P_i$ are not equal, the next data is retrieved to perform the calculation in step 403. Accordingly, the curves in FIG. 2 and FIG. 3 can be obtained by the process described above.

Consequently, the intelligent control module 106 can retrieve the energy-supplying information 101 of the power supply system 12 through the power monitoring module 100 and retrieve the load information 103 of the load 14 through the load management module 104 to calculate the first energy threshold TH0 and the second energy threshold TH1 instantly. The intelligent control module 106 further makes a comparison between the energy production $P_i$ of the renewable energy generation module 122 and the two thresholds, and controls the connection between the power supply system 12 and the load 14 accordingly. As a result, the power supply system 12 can supply power more efficiently.

Figure 5:
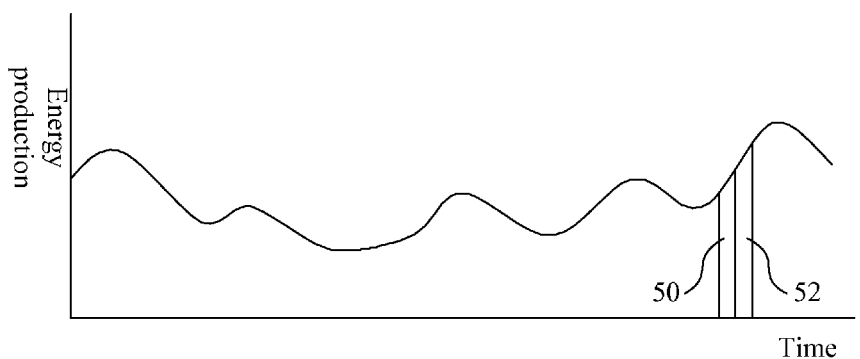
FIG. 5 is a graph showing energy production in another embodiment of the present disclosure.

FIG. 5 is a graph showing energy production in another embodiment of the present disclosure. It is noted that in the previous embodiments, the moving average, the variations and the moving average of the variations in the energy production are calculated according to the points on the curve of the energy production. In other embodiments, the moving average, the variations and the moving average of the variations in the energy production can also be calculated according to the areas within a unit time under the curve of the energy production, as shown in FIG. 5. For example, the areas 50 and 52 under the curve can be used as the values of the energy productions $P_{i-1}$ and $P_i$ to further calculate the moving average, the variations and the moving average of the variations in the energy production.

In an embodiment, when the energy production is larger than the first energy threshold TH0, the intelligent control module 106 determines that the amount of the energy generated by the renewable energy generation module 122 is larger than the amount of energy used by the load 14. Accordingly, the intelligent control module 106 controls the switch module 102 so that the renewable energy generation module 122 supplies energy to the load 14 and the energy storage module 124 is charged at the same time.

When the energy production is between the first energy threshold TH0 and the second energy threshold TH1, the intelligent control module 106 determines that the renewable energy generation module 122 is producing a sufficient amount of energy for use by the load 14. Accordingly, the intelligent control module 106 controls the switch module 102 so that the renewable energy generation module 122 supplies energy to the load 14.

When the energy production is smaller than or equal to the second energy threshold TH1, the intelligent control module 106 controls the switch module 102 so that the grid power source 120 or the energy storage module 124 supplies energy to the load 14. In an embodiment, the intelligent control module 106 further determines the relation of the amount of stored energy in the energy storage module 124 to a first energy storage threshold and to a second energy storage threshold. When the amount of the stored energy is larger than the first energy storage threshold, the intelligent control module 106 controls the switch module 102 so that the energy storage module 124 supplies energy to the load 14. When the amount of the stored energy is smaller than or equal to the first energy storage threshold, the intelligent control module 106 controls the switch module 102 so that the grid power source 120 supplies energy to the load 14. It is noted that when either the energy storage module 124 or the grid power source 120 is used to supply power to the load 14, the renewable energy generation module 122 continues to generate energy. Therefore, the intelligent control module 106 can make the renewable energy generation module 122 charge the energy storage module 124 when the energy storage module 124 or the grid power source 120 is used to supply power to the load 14. As a result, the energy generated by the renewable energy generation module 122 can be used more efficiently.

In an embodiment, when the energy storage module 124 is used to supply power to the load 14, the intelligent control module 106 continuously monitors the amount of the stored energy in the energy storage module 124 since the load 14 reduces the amount of the stored energy in the energy storage module 124. That is, the intelligent control module 106 determines whether the stored energy is smaller than a second energy storage threshold, and when the amount of the stored energy is smaller than the second energy storage threshold, the intelligent control module 106 controls the switch module 102 so that the grid power source 120 supplies energy to the load 14. In an embodiment, the second energy storage threshold can be different from the first energy storage threshold.

Accordingly, the first and the second energy thresholds TH0 and TH1 calculated instantly can be used to evaluate the energy production of the renewable energy generation module 122. As a result, the usage of the renewable energy generation module 122 can be more efficient. When the variations in the energy production of the renewable energy generation module 122 becomes excessive or the load becomes excessively large, the safe loading capacity increases to make the first and the second energy thresholds TH0 and TH1 increase as well. Therefore, the energy production does not easily exceed the first or the second energy thresholds TH0 and TH1, thereby increasing the possibility of using the grid power source or the energy storage module, both of which more stably supply power. When the variations in the energy production of the renewable energy generation module 122 reduce or the load is reduced in size, the safe loading capacity decreases to make the first and the second energy thresholds TH0 and TH1 decrease as well. Consequently, the energy production easily exceeds the first or the second energy thresholds TH0 and TH1, such that there is a higher possibility of using the renewable energy generation module 122.

In summary, the energy management system of the present disclosure is able to dynamically calculate the energy thresholds according to the energy-supplying information of the power supply system and the load information of the load to further determine whether the energy generated by the renewable energy generation module is sufficient to supply power to the load. The renewable energy generation module can be used to supply power to the load whenever it is generating a sufficient amount of energy. Hence, the energy generated by the renewable energy generation module can be used more efficiently. It is noted that the calculation of the first and the second energy thresholds in the above description is an example of one possible embodiment. In other embodiments, the first and the second energy thresholds can be determined using other appropriate methods.

Figure 6:
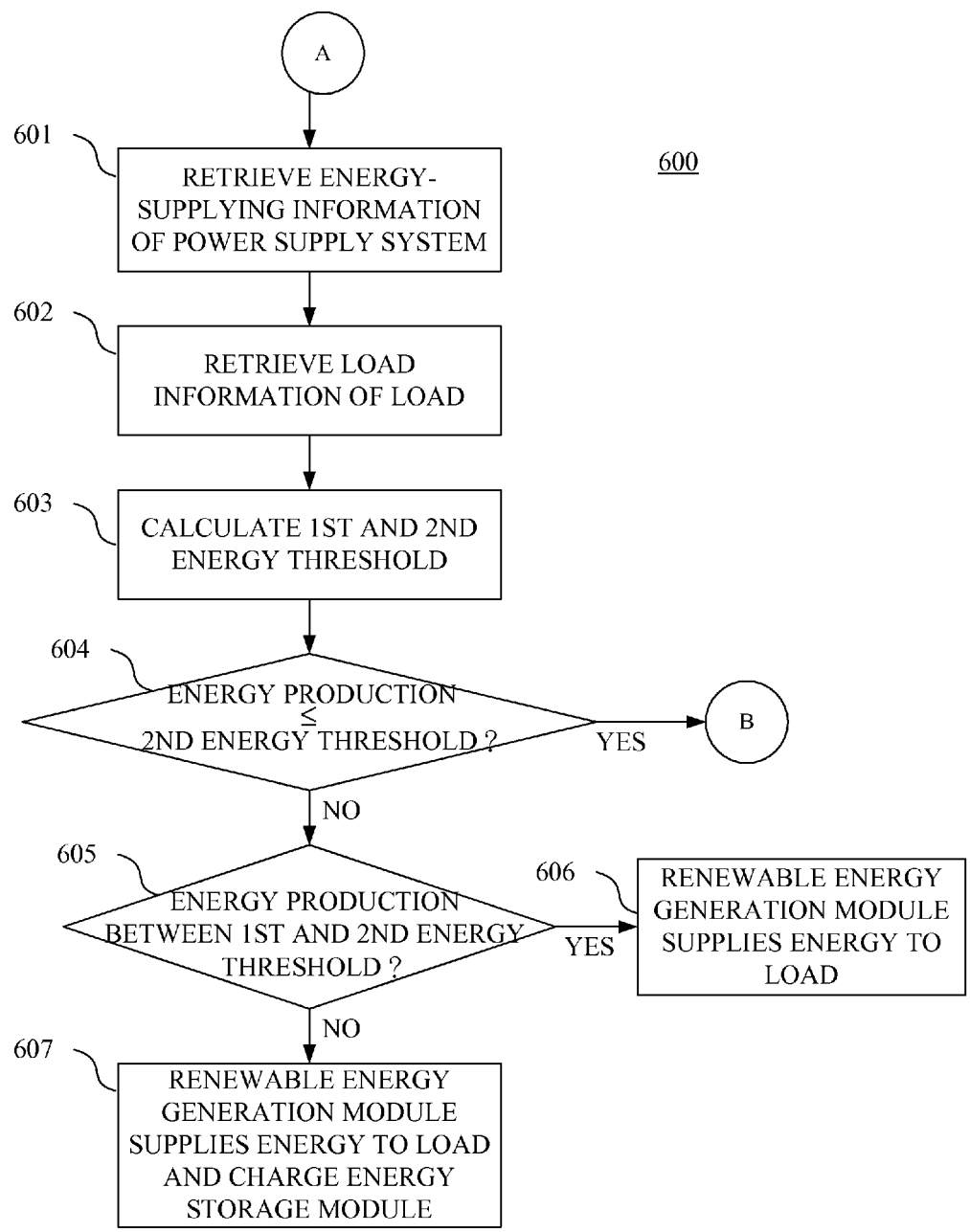
FIG. 6 is a flow chart of an energy management method in an embodiment of the present disclosure.

FIG. 6 is a flow chart of an energy management method 600 in an embodiment of the present disclosure. The energy management method 600 can be used in the energy management system 1 depicted in FIG. 1. The computer program can be stored in a computer readable medium such as a ROM (read-only memory), a flash memory, a floppy disc, a hard disc, an optical disc, a flash disc, a tape, a database accessible from a network, or any storage medium with the same functionality that can be contemplated by persons of ordinary skill in the art to which this invention pertains.

The energy management method 600 comprises the steps as outlined below.

The process of the energy management method 600 starts at point A. In step 601, the intelligent control module 106 retrieves the energy-supplying information 101 of the power supply system 12 through the power monitoring module 100. In step 602, the intelligent control module 106 retrieves the load information 103 of the load 14 through the load management module 104. In step 603, the intelligent control module 106 instantly calculates a first energy threshold and a second energy threshold smaller than the first energy threshold according to the energy-supplying information 101 and the load information 103. In step 604, the intelligent control module 106 determines whether the energy production is smaller than or equal to the second energy threshold. When the energy production is smaller than or equal to the second energy threshold, the process of the energy management method 600 goes to point B. The steps of the process after point B are described below with reference to FIG. 7.

When the energy production is not smaller than or equal to the second energy threshold, the intelligent control module 106 further determines whether the energy production is between the first and the second energy thresholds in step 605. When the energy production is between the first and the second energy thresholds, the intelligent control module 106 controls the switch module 102 so that the renewable energy generation module 122 supplies energy to the load 14 in step 606. When the energy production is not between the first and the second energy thresholds, the intelligent control module 106 determines that the energy production is larger than or equal to the first energy threshold and controls the switch module 102 so that the renewable energy generation module 122 supplies energy to the load 14 and also charges the energy storage module 124 in step 607.

Figure 7:
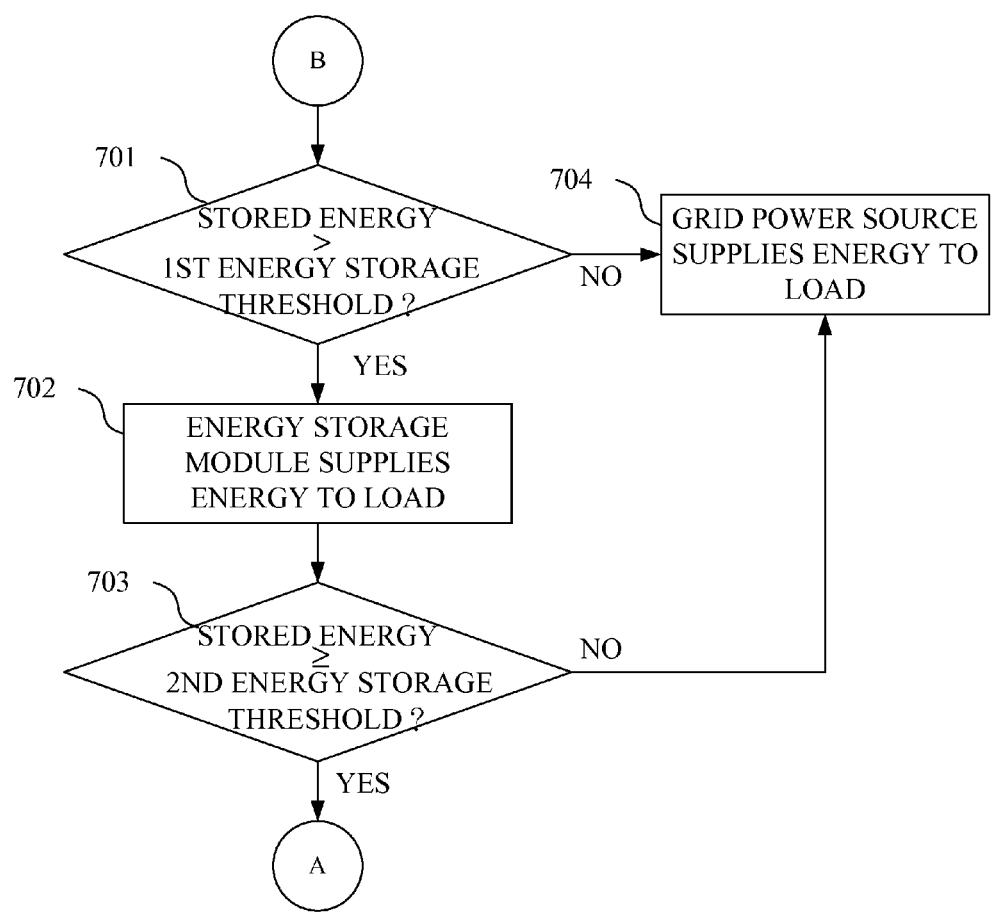
FIG. 7 is a flow chart of the steps after point B of the energy management method in FIG. 6.

FIG. 7 is a flow chart of the steps after point B of the energy management method 600 in FIG. 6. After determining that the energy production is smaller than or equal to the second energy threshold, the intelligent control module 106 determines whether the amount of the stored energy in the energy storage module 124 is larger than a first energy storage threshold in step 701. When the amount of the stored energy in the energy storage module 124 is larger than the first energy storage threshold, the intelligent control module 106 controls the switch module 102 so that the energy storage module 124 supplies energy to the load 14 and the renewable energy generation module 122 charges the energy storage module 124 in step 702. After step 702, the intelligent control module 106 determines whether the amount of the stored energy in the energy storage module 124 is larger than or equal to a second energy storage threshold in step 703. When the amount of the stored energy in the energy storage module 124 is larger than or equal to the second energy storage threshold, the process goes back to point A in FIG. 6. When the amount of the stored energy in the energy storage module 124 is smaller than the second energy storage threshold, the intelligent control module 106 controls the switch module 102 so that the grid power source 120 supplies energy to the load 14 and the renewable energy generation module 122 charges the energy storage module 124 in step 704. Similarly, when the amount of the stored energy is determined to be smaller than or equal to the first energy storage threshold in step 701, the process goes to step 704 so that the grid power source 120 supplies energy to the load 14 and the renewable energy generation module 122 also charges the energy storage module 124.

In summary, the energy management method of the present disclosure is able to dynamically calculate the energy thresholds according to the energy-supplying information of the power supply system and the load information of the load to further determine whether the energy generated by the renewable energy generation module is sufficient to supply power to the load. The renewable energy generation module can be used to supply power to the load whenever a sufficient amount of energy is generated thereby. Hence, the energy generated by the renewable energy generation module can be used more efficiently.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An energy management system connected between a power supply system and at least one load, wherein the power supply system comprises a grid power source, a renewable energy generation module and an energy storage module, the energy management system comprises:
   a power monitoring module connected to the power supply system to retrieve energy-supplying information of the power supply system, wherein the energy-supplying information comprises an energy production of the renewable energy generation module;
   a switch module to control a connection relation between the load and the power supply system;
   a load management module to retrieve load information of the load; and
   an intelligent control module to receive the energy-supplying information and the load information to instantly calculate a first energy threshold and a second energy threshold smaller than the first energy threshold;
   wherein when the energy production of the renewable energy generation module is smaller than or equal to the second energy threshold, the intelligent control module controls the switch module so that the grid power source or the energy storage module supplies energy to the load;
   when the energy production is between the first and the second energy thresholds, the intelligent control module controls the switch module so that the renewable energy generation module supplies energy to the load; and
   when the energy production is larger than the first energy threshold, the intelligent control module controls the switch module so that the renewable energy generation module supplies energy to the load and charges the energy storage module,
   wherein the energy-supplying information comprises an amount of stored energy in the energy storage module, in which when the energy production is smaller than or equal to the second energy threshold, the intelligent control module controls the switch module according to the amount of the stored energy, when the amount of stored energy is larger than a first energy storage threshold, the intelligent control module controls the switch module so that the energy storage module supplies energy to the load and the renewable energy generation module charges the energy storage module, and when the amount of the stored energy is smaller than or equal to the first energy storage threshold, the intelligent control module controls the switch module so that the grid power source supplies energy to the load and the renewable energy generation module charges the energy storage module.

2. The energy management system of claim 1, wherein when the amount of the stored energy is larger than the first energy storage threshold such that the intelligent control module controls the switch module so that the energy storage module supplies energy to the load, the intelligent control module further determines whether the amount of the stored energy is smaller than a second energy storage threshold such that when the amount of the stored energy is smaller than the second energy storage threshold, the intelligent control module controls the switch module so that the grid power source supplies energy to the load and the renewable energy generation module charges the energy storage module.

3. The energy management system of claim 1, wherein the first energy threshold is calculated according to a moving average of variations in the energy production and a total load amount of the load and the energy storage module, and the second energy threshold is calculated according to the moving average of the variations in the energy production and a load amount of the load.

4. The energy management system of claim 3, wherein the moving average of the variations in the energy production is calculated according to a difference of points on a curve of the energy production of the renewable energy generation module.

5. The energy management system of claim 3, wherein the moving average of the variations in the energy production is calculated according to a difference of areas within a unit time under a curve of the energy production of the renewable energy generation module.

6. The energy management system of claim 1, further comprising an DC/AC converter, wherein the renewable energy generation module or the energy storage module supplies energy to the load through the DC/AC converter.

7. The energy management system of claim 1, wherein the renewable energy generation module is a photovoltaic module, a wind power module or a hydroelectric power module.

8. An energy management method used in an energy management system, wherein the energy management system is connected between a power supply system and at least one load, wherein the power supply system comprises a grid power source, a renewable energy generation module and an energy storage module, the energy management method comprises the steps of:

retrieving energy-supplying information from the energy supply system, wherein the energy-supplying information comprises an energy production of the renewable energy generation module;

retrieving load information from the load;

instantly calculating a first energy threshold and a second energy threshold smaller than the first energy threshold according to the energy-supplying information and the load information; and determining a relation of the energy production and the first and the second energy thresholds;

wherein when the energy production of the renewable energy generation module is smaller than or equal to the second energy threshold, the grid power source or the energy storage module is controlled to supply energy to the load;

when the energy production is between the first and the second energy thresholds, the renewable energy generation module is controlled to supply energy to the load; and when the energy production is larger than or equal to the first energy threshold, the renewable energy generation module is controlled to supply energy to the load and charge the energy storage module, wherein the energy-supplying information comprises an amount of stored energy in the energy storage module, in which when the energy production is smaller than or equal to the second energy threshold, further comprising the steps of:

determining whether the amount of the stored energy is larger than a first energy storage threshold; and when the amount of stored energy is larger than the first energy storage threshold, the energy storage module is controlled to supply energy to the load and the renewable energy generation module is controlled to charge the energy storage module; and when the amount of the stored energy is smaller than or equal to the first energy storage threshold, the grid power source supply is controlled to supply energy to the load and the renewable energy generation module is controlled to charge the energy storage module.

9. The energy management method of claim 8, wherein when the amount of the stored energy is larger than the first energy storage threshold such that the energy storage module is controlled to supply energy to the load, further comprises a step of:

determining whether the amount of the stored energy is smaller than a second energy storage threshold, wherein when the amount of the stored energy is smaller than the second energy storage threshold, the grid power source is controlled to supply energy to the load and the renewable energy generation module is controlled to charge the energy storage module.

10. The energy management method of claim 8, wherein the first energy threshold is calculated according to a moving average of variations in the energy production and a total load amount of the load and the energy storage module, and the second energy threshold is calculated according to the moving average of the variations in the energy production and a load amount of the load.

11. The energy management method of claim 10, wherein the moving average of the variations in the energy production is calculated according to a difference of points on a curve of the energy production of the renewable energy generation module.

12. The energy management method of claim 10, wherein the moving average of the variations in the energy production is calculated according to a difference of areas within a unit time under a curve of the energy production of the renewable energy generation module.

13. The energy management method of claim 8, wherein the renewable energy generation module is a photovoltaic module, a wind power module or a hydroelectric power module.

14. A non-transitory computer readable storage medium to store a computer program to execute an energy management method used in an energy management system, wherein the energy management system is connected between a power supply system and at least one load, wherein the power supply system comprises a grid power source, a renewable energy generation module and an energy storage module, the energy management method comprises the steps of: retrieving energy-supplying information from the energy supply system, wherein the energy-supplying information comprises an energy production of the renewable energy generation module; retrieving load information from the load; instantly calculating a first energy threshold and a second energy threshold smaller than the first energy threshold according to the energy-supplying information and the load information; and determining a relation of the energy production and the first and the second energy thresholds; wherein when the energy production of the renewable energy generation module is smaller than or equal to the second energy threshold, the grid power source or the energy storage module is controlled to supply energy to the load; when the energy production is between the first and the second energy thresholds, the renewable energy generation module is controlled to supply energy to the load; and when the energy production is larger than or equal to the first energy threshold, the renewable energy generation module is controlled to supply energy to the load and charge the energy storage module, wherein the energy-supplying information comprises an amount of stored energy in the energy storage module, in which when the energy production is smaller than or equal to the second energy threshold, further comprising the steps of: determining whether the amount of the stored energy is larger than a first energy storage threshold; and when the amount of stored energy is larger than the first energy storage threshold, the energy storage module is controlled to supply energy to the load and the renewable energy generation module is controlled to charge the energy storage module; and when the amount of the stored energy is smaller than or equal to the first energy storage threshold, the grid power source supply is controlled to supply energy to the load and the renewable energy generation module is controlled to charge the energy storage module.

15. The non-transitory computer readable storage medium of claim 14, wherein when the amount of the stored energy is larger than the first energy storage threshold such that the energy storage module is controlled to supply energy to the load, further comprises a step of:

determining whether the amount of the stored energy is smaller than a second energy storage threshold, wherein when the amount of the stored energy is smaller than the second energy storage threshold, the grid power source is controlled to supply energy to the load and the renewable energy generation module is controlled to charge the energy storage module.

16. The non-transitory computer readable storage medium of claim 14, wherein the first energy threshold is calculated according to a moving average of variations in the energy production and a total load amount of the load and the energy storage module, and the second energy threshold is calculated according to the moving average of the variations in the energy production and a load amount of the load.

17. The non-transitory computer readable storage medium of claim 16, wherein the moving average of the variations in the energy production is calculated according to a difference of points on a curve of the energy production of the renewable energy generation module.

18. The non-transitory computer readable storage medium of claim 16, wherein the moving average of the variations in the energy production is calculated according to a difference of areas within a unit time under a curve of the energy production of the renewable energy generation module.

19. The non-transitory computer readable storage medium of claim 14, wherein the renewable energy generation module is a photovoltaic module, a wind power module or a hydroelectric power module.

* * * * *